United States Patent Office 2,762,813
Patented Sept. 11, 1956

2,762,813

PROCESS OF PRODUCING PIPERIDINE COMPOUNDS

Leslie Stephen Abbott, Banstead, and Archibald Robert Graham, Richmond, England, assignors to The Distillers Company Limited, Edinburgh, Scotland, a British company No Drawing. Application March 17, 1953, Serial No. 342,960

Claims priority, application Great Britain April 3, 1952

6 Claims. (Cl. 260—293.2)

The present invention relates to an improved process for the manufacture of heterocyclic compounds, particularly substituted piperidines.

It has been found that by condensing certain dialdehydes with ammonia or an amine, condensation and ring formation occurs with the production of an N-heterocyclic compound. The compound obtained may be unsaturated and it is frequently desirable to reduce the product obtained, or to carry out the process in the presence of a reducing agent.

Accordingly the present invention is for a process for the manufacture of substituted N-heterocyclic compounds which comprises reacting ammonia or a primary monoamine with a substituted dialdehyde in which the aldehyde groups are separated by three carbon atoms and isolating the substituted N-heterocyclic compound obtained. The present invention also comprises reducing with formic acid or hydrogen the substituted N-heterocyclic compound obtained, or carrying out the reaction under conditions of reduction with formic acid or hydrogen.

The type of N-heterocyclic compound obtained depends on the nature of the substituted dialdehyde starting material employed. Since the aldehyde groups of the dialdehyde are separated by three carbon atoms, a substituted piperidine ring compound will be obtained. The dialdehyde starting material of the present invention may be for example alkyl, alkoxy or alkoxyalkyl substituted glutardialdehydes, such as 2-methoxymethyl-2:4-dimethylpentane-1:5-dial, 2-ethoxy-methyl-2:4-dimethylpentane-1:5-dial, or 3-methyl glutardialdehyde.

The ammonia may be employed in gaseous form although it is preferred to use ammonia in solution in an organic solvent, for example an alcohol, or in water. Where aqueous ammonia is employed, it is preferred to use the concentrated solution of density 0.880 commonly known as 880 ammonia.

The primary monoamine employed is preferably an aliphatic primary monoamine which may be substituted or unsubstituted. Such amines, include the alkylamines such as, for example, methylamine, ethylamine, propylamine and the like and the alkylolamines such as, for example, ethanolamine, propanolamine, butanolamine and the like.

The reaction of the dialdehyde and the primary monoamine may be carried out under a wide variety of conditions. This condensation is suitably carried out at or about room temperature, subsequently increasing the temperature, if necessary, to take the reaction to completion. The reaction is suitably carried out in the presence of an inert organic solvent for one or more of the reactants. Such solvents include, for example, alcohols such as ethyl alcohol, propyl alcohols, butyl alcohols and the like and ethers, for example ethyl ether, propyl ether, butyl ether, dioxan and the like.

The substituted N-heterocyclic compound obtained may be isolated from the reaction mixture by any of the conventional methods as by distillation, suitably under reduced pressure, extraction and like methods.

The product obtained may be reduced to give a substituted N-heterocyclic compound of higher saturation than the product of the condensation reaction. This reduction may be effected by any of the conventional hydrogenation methods, suitably in the presence of a hydrogenation catalyst such as, for example, Raney nickel, platinum, palladium and like catalysts, which may be supported on suitable carriers, or by treatment with formic acid. In order to produce the same product, the condensation reaction itself may be carried out under reducing conditions with hydrogen or formic acid. Thus for example the reaction may be carried out in the presence of formic acid, or hydrogen may be bubbled through the reaction mixture, suitably in the presence of a hydrogenation catalyst. Where formic acid is used, it may be added per se or a formic acid yielding material may be used such as a formate or a formamide. Thus for example the ammonia or primary amine may be reacted in the form of the corresponding amide of formic acid. The formic acid is preferably used in excess of the equivalent amount with respect to the aldehyde groups.

While it is believed that the ammonia and amine starting materials react with the substituted dialdehydes to form N-heterocyclic compounds, and for example it is certain that the alkylolamines do so, it is possible that when using ammonia and certain amines, the N-heterocyclic ring formation may not occur until the condensation product has been reduced, unless the condensation is carried out under reducing conditions. When using ammonia it is preferred to carry out the condensation under reducing conditions.

The following examples are given to illustrate the process of the present invention. The parts and percentages quoted are by weight unless otherwise indicated.

*Example 1*

201 parts of 2-methoxymethyl-2:4-dimethylpentane-1:5-dial are added slowly to 122 parts of monoethanolamine dissolved in 55 parts of ethyl alcohol, the temperature not being allowed to rise above 30° C. The mixture is then refluxed at a temperature of about 100° C. for two hours, after which time the alcohol is distilled off, and the product distilled under reduced pressure. The product obtained is 6:7:8:9-tetrahydro-7-methoxymethyl - 5:7 - dimethyl - 1 - oxa - 9 - azaindane (boiling point 118° C. at 12 millimetres mercury pressure, refractive index $n^{d}_{20}$ 1.4885), the formula of which may be graphically shown as:

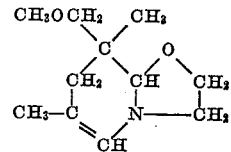

*Example 2*

A solution of 8 parts of methylamine in 25 parts of water and 80 parts of ethyl alcohol are added over a period of 1 hour to 43 parts of 2-methoxymethyl-2:4-dimethylpentane-1:5-dial in 160 parts of ethyl alcohol, the temperature not being allowed to rise above 30° C. The solution is distilled and finally fractionated giving a colourless liquid (boiling point 60–61° C. at 1 millimetre mercury pressure, refractive index $n^{d}_{20}$ 1.4642). This liquid on hydrogenation yields 1:3:5-trimethyl-3-methoxymethyl piperidine (boiling point 75° C. at 10–12 millimetres mercury pressure, refractive index 1.4472).

Example 3

A solution of 8 parts of methylamine in 25 parts of water is added to 50 parts of 2-methoxymethyl-2:4-dimethyl-pentane-1:5-dial in solution in 65 parts of ethyl alcohol, the temperature not being allowed to rise above 30° C., and the mixture allowed to stand for 50 hours. 26 parts of 98% formic acid is added slowly to the mixture and carbon dioxide is freely evolved during the exothermic reaction which occurs. The mixture is refluxed at a temperature of about 100° C. until evolution of carbon dioxide ceases, and the product is then distilled giving 1:3:5-trimethyl-3-methoxymethyl piperidine.

Example 4

A solution of 30 parts of ammonia in 240 parts of methyl alcohol is added to 50 parts of 2:4-dimethyl-2-methoxy-methyl-pentane-1:5-dial and 20 parts of Raney nickel and the mixture treated with hydrogen under a pressure of 50–60 atmospheres at a temperature of 100° C. The product obtained is fractionally distilled giving 37.7 parts of 3:5-dimethyl-3-methoxy-methyl-piperidine (boiling point 78–82° C. at 15 mm. of mercury pressure, refractive index $n^{d}{}_{20}$ 1.4550).

Example 5

37 parts by weight of 3-methylglutardialdehyde (0.3 molecular proportion) are added to 300 parts of a 1.5 normal methanolic ammonia solution (0.45 molecular proportion) in a pressure vessel and subjected as rapidly as possible to Raney nickel catalysed hydrogenation at pressures of approximately 100 atmospheres and at temperatures of 100 to 110° C. until hydrogen absorption ceases. The reaction product is filtered and fractionally distilled to give 4-methylpiperidine.

We claim:

1. A process for the manufacture of a piperidine which is substituted in the piperidine ring by a radical selected from the group consisting of lower alkyl, lower alkoxy and lower alkoxyalkyl, which comprises condensing a molar excess of nitrogenous base selected from the group consisting of ammonia, a primary lower alkyl amine and a primary lower alkylol amine, with a pentane-1:5-dialdehyde substituted by a radical selected from the group consisting of lower alkyl, lower alkoxy and lower alkoxyalkyl, in an inert liquid organic solvent selected from the group consisting of lower alcohols and ethers, subjecting the reaction product to the action of a reducing agent selected from the group consisting of hydrogen and formic acid, and isolating the resultant product.

2. A process for the manufacture of a piperidine which is substituted in the piperidine ring by a radical selected from the group consisting of lower alkyl, lower alkoxy and lower alkoxyalkyl, which comprises condensing a molar excess of nitrogenous base selected from the group consisting of a primary lower alkyl amine and a primary lower alkylol amine, with a pentane-1:5-dialdehyde substituted by a radical selected from the group consisting of lower alkyl, lower alkoxy and lower alkoxyalkyl, in an inert liquid organic solvent selected from the group consisting of lower alcohols and ethers, and hydrogenating the resultant product.

3. A process according to claim 2, wherein said nitrogenous base is monoethanolamine, said substituted pentane-1:5-dialdehyde is 2-methoxymethyl-2:4-dimethylpentane-1:5-dial, and said resultant product is 6:7:8:9-tetrahydro-7-methoxymethyl-5:7-dimethyl-1-oxa-9-azaindane.

4. A process according to claim 1, wherein said nitrogenous base is methylamine, said substituted pentane-1:5-dialdehyde is 2-methoxymethyl-2:4-dimethyl-pentane-1:5-dial, and said resultant product is 1:3:5-trimethyl-3-methoxymethyl piperidine.

5. A process according to claim 1, wherein said nitrogenous base is ammonia, said substituted pentane-1:5-dialdehyde is 2:4-dimethyl-2-methoxy-methyl-pentane-1:5-dial, and said resultant product is 3:5-dimethyl-3-methoxymethyl-piperidine.

6. A process according to claim 1, wherein said nitrogenous base is ammonia, said substituted pentane-1:5-dialdehyde is 3-methylglutardialdehyde, and said resultant product is 4-methylpiperidine.

References Cited in the file of this patent

UNITED STATES PATENTS

| 2,019,419 | Lazier | Oct. 29, 1935 |
| 2,045,574 | Adkins | June 30, 1936 |
| 2,528,978 | Smith | Nov. 7, 1950 |
| 2,546,018 | Smith | Mar. 20, 1951 |

FOREIGN PATENTS

| 334,193 | Great Britain | 1930 |
| 663,294 | Great Britain | Dec. 19, 1951 |

OTHER REFERENCES

Schonberg: J. Chem. Soc., pp. 176–82 (1948).
Maier: Das Pyridine und seine Derivate, p. 6 (1934).